United States Patent
Weber

(10) Patent No.: US 12,282,977 B2
(45) Date of Patent: Apr. 22, 2025

(54) METHOD FOR USING A PROCESSOR UNIT AND VEHICLE

(71) Applicant: DAIMLER AG, Stuttgart (DE)

(72) Inventor: Thomas Weber, Herrenberg (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 1429 days.

(21) Appl. No.: 16/970,045

(22) PCT Filed: Sep. 21, 2018

(86) PCT No.: PCT/EP2018/000442
§ 371 (c)(1),
(2) Date: Aug. 14, 2020

(87) PCT Pub. No.: WO2019/057330
PCT Pub. Date: Mar. 28, 2019

(65) Prior Publication Data
US 2021/0094436 A1   Apr. 1, 2021

(30) Foreign Application Priority Data
Sep. 25, 2017   (DE) ...................... 10 2017 008 956.6

(51) Int. Cl.
*G06Q 50/40*   (2024.01)
*B60L 53/00*   (2019.01)
(Continued)

(52) U.S. Cl.
CPC .............. *G06Q 50/40* (2024.01); *B60L 53/00* (2019.02); *B60L 53/12* (2019.02); *B60L 53/18* (2019.02);
(Continued)

(58) Field of Classification Search
CPC .......... B60L 53/00; B60L 53/12; B60L 53/18; B60L 53/302; B60L 53/665; G06Q 20/382; G06Q 50/30; G06Q 2220/00
See application file for complete search history.

(56) References Cited

U.S. PATENT DOCUMENTS

| 9,296,302 B2 | 3/2016 | Birke et al. |
| 9,960,637 B2 * | 5/2018 | Sanders ................... H02J 15/00 |

(Continued)

FOREIGN PATENT DOCUMENTS

| CN | 102470774 A | 5/2012 |
| CN | 102541010 A | 7/2012 |

(Continued)

OTHER PUBLICATIONS

Communication dated Jan. 26, 2022 in related/corresponding EP Application No. 20166670.8.

(Continued)

*Primary Examiner* — Angela Y Ortiz
*Assistant Examiner* — Torrence S Marunda, II
(74) *Attorney, Agent, or Firm* — PATENT PORTFOLIO BUILDERS PLLC

(57) ABSTRACT

A method for using a processor unit of an autonomously movable vehicle involves making a computing power of the processor unit available to at least one external computer network and/or to a computer cluster during a process of charging an electrical energy storage unit of the vehicle.

13 Claims, 1 Drawing Sheet

Figure 1:
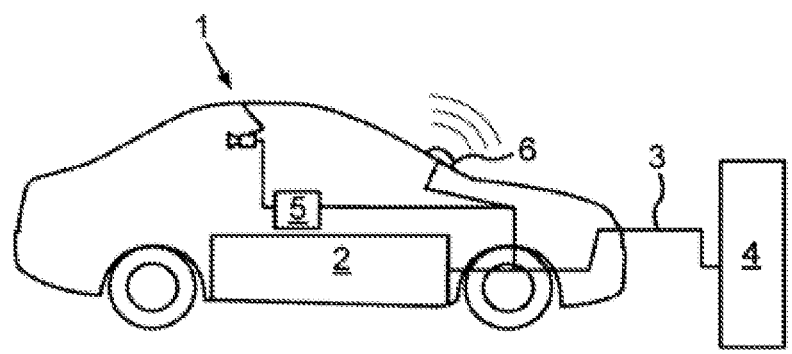

(51) Int. Cl.
*B60L 53/12* (2019.01)
*B60L 53/18* (2019.01)
*B60L 53/302* (2019.01)
*B60L 53/66* (2019.01)
*G06Q 20/38* (2012.01)

(52) U.S. Cl.
CPC ........... *B60L 53/302* (2019.02); *B60L 53/665* (2019.02); *G06Q 20/382* (2013.01); *G06Q 2220/00* (2013.01)

(56) References Cited

U.S. PATENT DOCUMENTS

| | | | | |
|---|---|---|---|---|
| 9,967,329 | B2* | 5/2018 | Reber | G06Q 20/22 |
| 10,369,974 | B2* | 8/2019 | Carlson | F17C 5/007 |
| 10,861,112 | B2* | 12/2020 | Forbes, Jr. | G06Q 30/0283 |
| 2002/0188384 | A1* | 12/2002 | Becker | G06F 9/5072 |
| | | | | 701/1 |
| 2012/0271758 | A1* | 10/2012 | Jammer | G07F 15/003 |
| | | | | 701/22 |
| 2014/0148965 | A1* | 5/2014 | Epstein | B60L 53/14 |
| | | | | 700/297 |
| 2015/0112507 | A1 | 4/2015 | Loewel et al. | |

FOREIGN PATENT DOCUMENTS

| | | |
|---|---|---|
| CN | 103853132 A | 6/2014 |
| CN | 104396218 A | 3/2015 |
| DE | 102016004851 A1 | 12/2016 |
| JP | 2007099161 A | 4/2007 |
| WO | 2017079222 A1 | 5/2017 |

OTHER PUBLICATIONS

Communication dated Jan. 26, 2022 in related/corresponding EP Application No. 20166685.6.
Lam et al.; "Coordinated Autonomous Vehicle Parking for Vehicle-to-Grid Services: Formulation and Distributed Algorithm;" IEEE Transactions on Smart Grid, Sep. 2018; vol. 9, No. 5.
Maiyya et al.; "Database and Distributed Computing Fundamentals for Scalable, Fault-tolerant, and Consistent Maintenance of Blockchains;" Proceedings of the VLDB Endowment; Aug. 2018; vol. 11, No. 12.
Trafford; "Cryptocurrency as Reimbursement for Distributed Computing;" Region 2 IEEE SAC 2014; Apr. 2014; https://www.researchgate.net/profile/Russell_Trafford/publication/263423786_Cryptocurrency_as_Reimbursement_for_Distributed_Computing/links/0c96053ac59e4b9736000000/Cryptocurrency-as-Reimbursement-for-Distributed-Computing.pdf.
Gerla et al., "Internet of Vehicles: From Intelligent Grid to Autonomous Cars and Vehicular Clouds," 2014 IEEE World Forum on Internet of Things (WF-IoT), Mar. 2014.
International Preliminary Report on Patentability mailed on Mar. 31, 2020 in related/corresponding International Application PCT/EP2018/000442.
International Search Report mailed Jan. 17, 2019 in related/corresponding International Application PCT/EP2018/000442.
Lee et al., "Internet of Vehicles: From intelligent grid to autonomous cars and vehicular fogs," International Journal of Distributed Sensor Networks, Sep. 2016, vol. 12(9).
Search Report mailed on Jul. 20, 2020 in related/corresponding EP Application No. 20166670.8.
Search Report mailed on Jul. 30, 2020 in related/corresponding EP Application No. 20166685.6.
Written Opinion mailed Jan. 17, 2019 in related/corresponding International Application PCT/EP2018/000442.
Office Action dated Jan. 16, 2025 in related/corresponding CN Application No. 201880089551.6.

* cited by examiner

METHOD FOR USING A PROCESSOR UNIT AND VEHICLE

BACKGROUND AND SUMMARY OF THE INVENTION

Exemplary embodiments of the invention relate to a method for using a processor unit of an autonomously movable vehicle.

WO 2017/079222 A1 discloses a software application for querying and controlling an autonomous vehicle service. The software application makes provision such that a drive command is received from a user device in order to transport a user to a destination from a point of origin by means of an autonomous vehicle system service. Based on the point of origin, the autonomous vehicle system service defines an autonomous vehicle system, which is managed by the vehicle system service. The drive command is then provided to the autonomous vehicle system, wherein information is transmitted to the user device via the autonomous vehicle system.

Exemplary embodiments of the invention are directed to a method, improved over the prior art, for using a processor unit of an autonomously movable vehicle.

According to the invention, a method for using a processor unit of an autonomously movable vehicle makes provision such that a computing power of the processor unit is made available to at least one off-board processing network and/or to a cluster of off-board computing units during a process of charging an electric energy storage unit of the vehicle.

By using the method, resources present in the vehicle can be used during idle times, in particular while charging the electric storage unit of the vehicle, thereby increasing the economic efficiency of the vehicle.

In addition, the societal benefit of an autonomous driving mode can be augmented by means of the provision of the processor unit, which is a high-performance processor unit.

Furthermore, using the method offers the possibility of smart fleet utilization, wherein the vehicle is part of a vehicle fleet and is used commercially.

In an advantageous embodiment of the invention, a number of processor units of autonomously movable vehicles are used to form a virtual high-performance processor, which is centrally managed by a server. The server can also be designated as backend and it is an off-board electronic processing device provided in addition to the vehicles. The preceding and following statements regarding the autonomously movable vehicle used in the scope of the method according to the invention are also applicable to the other vehicles and vice versa. The corresponding vehicle is, for example, a motor vehicle, in particular an automobile, which can be configured as a car. The corresponding vehicle has a corresponding processor unit, which is an electronic processor unit. By means of the corresponding electronic processor unit, the corresponding vehicle can be moved autonomously, in other words driven autonomously or automatically. The number of vehicles is preferably greater than 2 and preferably greater than 3. The vehicles whose processor units form the virtual high-performance processor are, for example, vehicles of a vehicle fleet, or just 'fleet'. Thus, provision is preferably made such that the fleet, or rather the vehicles thereof, is/are used to form the virtual high-performance processor from the processor units of the vehicles of the fleet. To this end, for example, the processor units of the vehicles are coupled for data processing to one another and/or to the server via communication connections, in particular via the internet. Since the corresponding computing power of the corresponding processor unit is particularly high in order to enable the corresponding vehicle to be driven autonomously, a particularly high overall computing power of the virtual high-performance processor is achievable.

The corresponding vehicle is configured as, for example, a hybrid vehicle or e-vehicle, in particular as a battery electric vehicle (BEV). The corresponding vehicle has an electrical energy storage unit, by means of which electrical energy or electric current can be stored. The corresponding energy storage unit is preferably a high voltage component whose electric voltage, in particular electric operating voltage, is preferably greater than 12 volts and is preferably at least 48 volts. The electric voltage, in particular the electric operating voltage, is preferably greater than 50 volts. It has been proven to be particularly advantageous if the electric voltage, in particular the electric operating voltage, of the corresponding energy storage unit is several hundred volts. It is thus possible to achieve particularly high electrical outputs for powering the corresponding vehicle electrically.

The corresponding vehicle has, for example, at least one electric machine by means of which the corresponding vehicle can be electrically powered. To this end, the electric machine is operated in a motor mode and thus as an electric motor. To operate the electric machine in the motor mode, the electric machine is supplied with electrical energy, which is stored in the energy storage unit. The corresponding vehicle is idle in or during the charging process, in other words at a standstill and therefore not moving, in particular neither being moved autonomously nor being driven autonomously. Hence with the method according to the invention, the corresponding processor unit, or rather the computing power thereof, which is typically not used during the charging process, can be at least partially used by making the computing power available to the processing network or to the cluster.

The utilization of the fleet is based on the idea that provision is being made, initially or in a first step, such that only vehicles of a vehicle fleet that is not privately owned can be moved or driven autonomously or automatically in order to ensure a high level of safety. The vehicles whose processor units form the high-performance processor can thus be managed in a particularly expedient and advantageous manner, in particular in terms of the formation of the high-performance processor or in terms of the capacity to provide the processing network or the cluster with the corresponding computing power. However, using a privately owned vehicle or multiple privately owned vehicles to form the high-performance processor or to provide the processing network or the cluster with the computing power is obviously readily conceivable.

A further embodiment is characterized in that the computing power is provided for a fee. This embodiment is based on the idea that the vehicle whose computing power is being provided to the processing network or to the cluster is rendering a performance or service that requires payment. The vehicle, in particular its driver or user, thus receives the payment because the user, who is, for example, the owner of the vehicle, is making his vehicle available in such a way that the computing power of the processor unit of the vehicle is made available to the processing network or to the cluster. The fee is thus a reimbursement that the user receives for making his vehicle available to the processing network or to the cluster. The user, who must bear the costs for the purchasing, maintenance and operation of the vehicle, thus receives a reimbursement or return service in the form of the payment for providing the processing network or the cluster with the computing power of the processor unit of the vehicle.

In a further embodiment of the invention, it has proven to be particularly advantageous if a communication, in particular of the vehicle, with the server takes place via a data interface of the vehicle. This ensures a secure and rapid communication between the server and the vehicle such that the high-performance processor, for example, can be operated effectively and efficiently.

A further embodiment of the invention involves determining the fee based on a number of computing operations performed by means of the processor unit and provided to the processor network or cluster. For example, the greater the number of computing operations, the higher the fee. The owner of the vehicle can thus earn a considerable amount by making his vehicle available to the processing network or to the cluster. Because a particularly large number of computing operations can be performed by the vehicle, the cluster or the processing network also benefits from this.

In a particularly advantageous embodiment of the invention, the fee is received and/or calculated and/or paid via at least one blockchain process. For receiving and/or calculating or paying the fee, use is thus preferably made of at least one blockchain, by which particularly secure and precise invoicing can be ensured.

In a further design of the invention, the computing power of the processor unit is made available to the processing network and/or to the cluster on the basis of a charge status of the energy storage unit of the vehicle. The charge status of the energy storage unit characterizes a volume of electrical energy or electric current stored in the energy storage unit. By considering the charge status, for example, it is possible to prevent an excessively large portion of the computing power from being made available to the processing network or to the cluster, and/or a time interval for which the energy storage unit has to be charged in order to reach a predeterminable or predetermined charge status can be kept to a minimum. By means of this embodiment, for example, it can be ensured that the energy storage unit, if it initially has a very low charge status, can be charged very quickly with a high volume of electrical energy, thus enabling a high value of the charge status to be reached in a short time. After reaching or exceeding the value, for example, the computing power to be provided to the processing network or to the cluster by the processor unit of the vehicle can be increased, since an advantageously large volume of electrical energy has already been stored in the energy storage unit.

It has been proven to be particularly advantageous if the computing power of the processor unit of the vehicle supplied to the processing network and/or to the cluster is augmented, i.e., increases, in direct proportion to the increasing volume of electrical energy stored in the energy storage unit of the vehicle. This permits a sort of prioritization to be performed. For example, recharging the energy storage unit is initially prioritized over providing computing power so that first a particularly large volume of electrical energy can be stored in the energy storage unit in a short amount of time, whereas, for example, only a small portion of the computing power, or even no computing power, is provided to the network or to the cluster. For example, if a sufficiently large volume of electrical energy has been stored in the energy storage unit after a certain time, then the provision of computing power can be augmented with respect to the recharging of the energy storage unit such that the energy storage unit is charged at a lower rate, but a particularly large portion or all of the computing power of the processor unit is made available to the processing network or to the cluster. On one hand, it is thus possible to keep a charging time for recharging the energy storage unit particularly small. On the other hand, it is possible to ensure that a sufficiently large amount of computing power of the processing unit can be made available to the processing network or to the cluster.

A further embodiment involves the computing power of the processor unit being made available based on predictive data. In particular, this is understood to mean the following: At a first point in time or during a first time interval, a future event and/or a future status, in particular of the vehicle, is determined, in particular by means of the processor unit of the vehicle, wherein the event or the status occurs or arises at a second point in time or during a second time interval, and wherein the second point in time or the second time interval chronologically follows the first point in time or the first time interval. Thus, the event is a future event or the status is a future status. In particular, the computing power is provided at a third point in time or during a third time interval, wherein the second point in time or the second time interval is preceded chronologically by the third point in time or third time interval. This means that during the provision of the computing power, consideration is given to the event or status that will only occur or arise with a certain probability in the future and that has not yet occurred or will not occur during the provision of the computing power. A desired status of the vehicle at the second point in time can thus be ensured or avoided. In particular it is possible to ensure, for example, that the energy storage unit has a desired charge status at the second point in time, and/or that undesired temperatures of the vehicle can be avoided at the second point in time. By considering predictive data, it can be ensured that the vehicle, at the second point in time, is ready to drive, in particular in terms of an autonomous drive, and in terms of a sufficiently large volume of electrical energy stored in the energy storage unit, so that a predeterminable or predetermined route can be driven electrically and, say, autonomously starting from the second point of time.

It has thus proven to be particularly advantageous if the predictive data comprise an anticipated, future charge status of the energy storage unit, i.e., an anticipated, future value of the charge status. It can thus be ensured, for example, that at the second point in time, for example, the amount of electrical energy stored in the energy storage unit suffices to drive a predeterminable or predetermined distance electrically. As an alternative or in addition, the predictive data comprise a planned route of the vehicle, which for example will be driven along the route with a certain probability, in particular after the charging process. By considering the route, it is possible to ensure that the vehicle, after the charging and after the provision of the computing power, will be able to travel the route autonomously and, say, at least partially or entirely electrically.

As an alternative or in addition, the predictive data comprise an anticipated, future temperature, in particular of the vehicle and thus of the processor unit and/or of the electric machine and/or of the energy storage unit, for example. For example, it is thus possible to prevent the vehicle, in particular processor unit and/or the energy storage unit and/or the electric machine, from having an excessively high temperature at the start of a trip following the charging process and the provision of the computing power, which could negatively impact a desired performance capacity and/or a desired electric range of the vehicle.

As an alternative or in addition, the predictive data can characterize an anticipated, future environment of the vehicle. If, for example, it is determined, based on the predictive data, that the vehicle, after the charging process and after the provision of the computing power, will be exposed to an environment in which particularly high temperatures prevail, the computing power can then be provided, for example, in such a way that the processor unit and/or the energy storage unit will have a sufficiently low temperature after the provision of the computing power such that exposure of the vehicle to such an environment will not result in an excessively high temperature of the vehicle, in particular of the processor unit and/or of the energy storage unit.

As an alternative or in addition, the predictive data comprise a time of an anticipated, future beginning of a trip of the vehicle. It is thus possible to ensure that a sufficiently high volume of electrical energy is stored in the energy storage unit at the time of the beginning of the trip, for example to enable a desired distance to be driven electrically.

As an alternative or in addition, the predictive data can comprise an anticipated, future status of the processing network and/or of the cluster and/or of an off-board power grid, for example one to which the vehicle is connected, at least electrically, during the charging process. The vehicle, in particular the processor unit, can thus be operated in a needs-appropriate manner in order to set or avoid a desired status of the vehicle at a future point in time. The background of this embodiment lies, in particular, in that, on one hand, it is desirable to be able to provide the processing network or the cluster with a particularly high computing power of the processor unit of the vehicle. On the other hand, the performance capacity and drivability of the vehicle after the charging process and after the provision of the computing power should not be adversely impacted for the user of the vehicle, meaning that the user can still use and operate his vehicle in an advantageous fashion in spite of having provided the computing power.

A further embodiment involves, during at least a portion of the process of charging the energy storage unit of the vehicle, receiving electrical energy from the aforementioned off-board power grid and in particular storing it in the storage unit. Accordingly, under charging process it should be understood in particular that the volume of electrical energy stored in the energy storage unit is augmented by the charging process. To this end, the vehicle or rather the energy storage unit receives electrical energy, which is supplied by the power grid. The electrical energy supplied by the power grid is stored in the energy storage unit.

During the charging process, the vehicle, in particular the energy storage unit, is at least directly connected, at least electrically, to the power grid via at least one physical power line. To this end, the power line is connected, at least electrically, to the vehicle on one hand, in particular directly, and to a charging device, in particular to a charging pole on the other hand. Via the power line, the electrical energy supplied by the power grid is transferred to the vehicle and in particular to the energy storage unit, and the energy storage unit receives the electrical energy. A first portion greater than zero of the electrical energy supplied by the power grid can be stored, for example, in the energy storage unit in order to recharge the energy storage unit. A second portion greater than zero of the electrical energy supplied by the power grid can be used, for example, to operate the processor unit of the vehicle such that the computing power of the processor unit can be made available to the processing network or to the cluster. The respective portions of the electrical energy, in particular the respective quantities or values of the portions of the electrical energy, can be set by means of the prioritization or consideration of predictive data described in the preceding such that the energy storage unit can be charged in a particularly needs-appropriate manner, particularly in such a way that the vehicle has a desired status at the described second point in time, i.e., after the charging process and after the provision of the computing power.

It has furthermore been shown to be particularly advantageous if, during at least a portion of the charging process, the energy storage unit of the vehicle feeds electrical energy into an off-board power grid or into the aforementioned power grid. Thus, provision is preferably made for bidirectional charging or for a bidirectional charging process, in the scope of which the energy storage unit can receive electrical energy from the power grid and store it in itself and supply electrical energy already stored in itself and feed it into the power grid. The feeding of electrical energy stored in the energy storage unit into the power grid can be advantageous if an especially large volume of electrical energy is stored in the energy storage unit and a future, anticipated start of a trip with the vehicle will not take place until the relatively remote future. The electrical energy is preferably fed into the power grid for a fee, which the vehicle or rather the user receives since the vehicle feeds electrical energy that is first stored in the energy storage unit into the power grid. The volume of electrical energy stored in the energy storage unit is thereby decreased. The feeding of electrical energy into the power grid can take place, for example, during time intervals during which the fee that the user receives for the feeding of electrical energy into the power grid is particularly high.

To ensure an advantageous charge status at the start of a drive, provision can be made such that the energy storage unit—after it has fed electrical energy into the power grid—receives electrical energy from the power grid and stores it in itself, in particular during at least such a time interval during which the feeding of electrical energy into the power grid is not subject to a fee or else only to a small fee. On the one hand, the power grid can be advantageously supported or stabilized by this means. On the other hand, the user can profit from the stabilization of the power grid, as the user receives a reimbursement for the in-feeding.

Accordingly, it has been shown to be particularly advantageous if the energy storage unit receives the electrical energy from the power grid and/or feeds it into the power grid based on a price for the energy drawn from the power grid and/or based on a price for the energy fed into the power grid during the portion of the charging process.

A further embodiment involves the vehicle receiving at least one coolant via at least one coolant line from an off-board cooling device during the charging process, by means of which coolant at least one component, in particular the energy storage unit and/or the processor unit, of the vehicle is cooled during the charging process. The coolant is, for example, a gas, in particular air, or a liquid. Excessive and undesired temperatures of the vehicle can be avoided by the cooling of the at least one component or multiple components of the vehicle.

During the charging process, the vehicle, in particular the energy storage unit, is connected, at least electrically, to the power grid via the aforesaid power line. The power line and the coolant line, for example, are preferably combined into a common line such that the vehicle can be connected simultaneously to the power grid and to the cooling device.

Lastly, it has been shown to be particularly advantageous if the processor unit is coupled to the processing network and/or to the cluster via at least one wireless data connection and/or via at least one physical data cable. The communication via the data interfaces described in the preceding takes place wirelessly or via the physical data cable. The wireless data connection is established via radio, for example. If provision is made of the data cable, then provision is preferably made such that the data cable is combined with the power line and/or with the coolant line into an overall line. As a result, the connection of the vehicle to the processing network or to the data cable is established simultaneously with the connection of the vehicle to the coolant line and/or to the power line, thus making the method achievable in a particularly expedient and convenient fashion.

BRIEF DESCRIPTION OF THE DRAWING FIGURES

Figure 2:
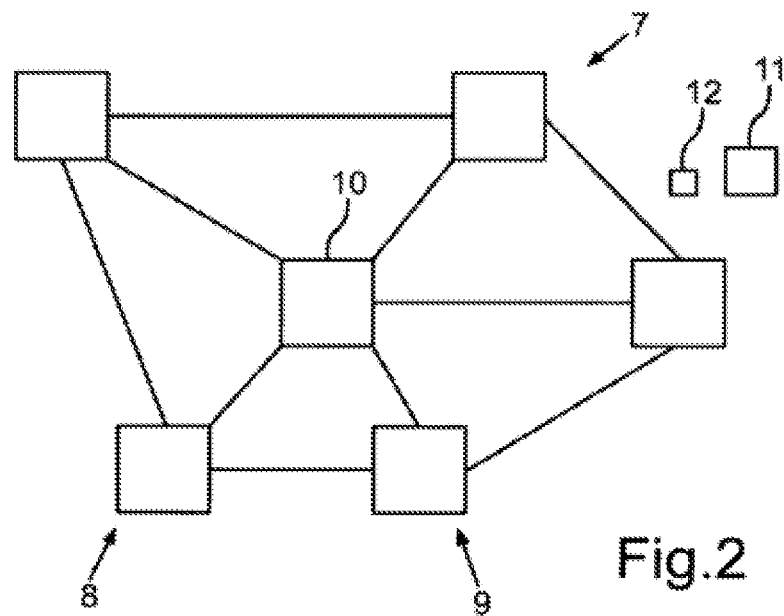

Exemplary embodiments of the invention are explained in more detail in the following, with reference to a drawing, in which:

FIG. 1 shows, in schematic fashion, a vehicle coupled to a charging infrastructure for charging the energy storage unit of the vehicle; and FIG. 2 shows a schematic representation of a processing network, which is provided with a computing power of a processor unit of the vehicle during a charging process.

DETAILED DESCRIPTION

FIG. 1 illustrates a vehicle 1 having an electrical energy storage unit 2 connected to a charging infrastructure 4 for charging by means of a data and energy coupling 3.

The vehicle 1 is an e-vehicle or a hybrid vehicle having an electric drive unit (not shown in any further detail), wherein the vehicle 1 is equipped with an assistance system, by means of which the vehicle 1 can be moved in the autonomous driving mode.

In the autonomous driving mode, a vehicle user of the vehicle 1 turns his/her driving duty completely over to the vehicle 1, wherein it is also conceivable for there not to be any vehicle user in the vehicle 1 during the autonomous driving mode.

Autonomous driving, aka highly automated driving, will be characterized in the future by the technical elements listed in the following.

Executing the autonomous driving mode requires the use of a high-performance processor unit 5 and the use of a comparatively high-speed network technology.

Particularly if the vehicle 1 is an e-vehicle, it is necessary to recharge the electrical energy storage unit 2 periodically.

In addition, the vehicle 1 is a commercial vehicle 1, which can be part of a vehicle fleet that is centrally managed by a fleet management system.

When the vehicle 1 is connected to the charging infrastructure 4 in order to charge the electrical energy storage unit 2, the processor unit 5 of the vehicle 1 is not used. In other words, a computer architecture of the vehicle 1 is not in use during the charging times.

To use the processor unit 5 of the vehicle 1 during the charging time and by doing so generate profits, a computing power of the processor unit 5 is made available to at least one off-board processing network and/or to a cluster of off-board computing units.

The processor units 5 of a number of such vehicles 1, whose electrical energy storage units 2 are being charged simultaneously, thus form a virtual high-performance processor, which constitutes a virtual high-performance platform with processing time to be sold for a fee. This virtual high-performance processor is managed centrally via a server.

In particular, the processor unit 5 is made available for so-called Bitcoin mining. Bitcoin mining is understood to mean a process in which computing power is made available in a computer network for processing the transactions, protection and synchronization of all users. The mining thus forms a type of decentralized Bitcoin computer center with miners, i.e., users. In Bitcoin mining, a user receives a reward for a useful service. A corresponding number of Bitcoin shares are thus paid out in accordance with a supplied processor capacity.

Each vehicle 1 can "mine" Bitcoins locally by making the processor unit 5 available.

The processor unit 5 of the vehicle 1 is accessed via a wireless data interface 6, in particular via a so-called radio interface, wherein this data interface 6 forms a communication unit. In particular, a communication with the server takes place via this data interface 6.

FIG. 2 schematically illustrates the aforementioned processing network, which is designated by 7 in FIG. 2 and is outside the vehicle 1 and thus off-board, wherein the preceding and following embodiments regarding the processing network 7 are readily transferrable to the aforementioned cluster and vice versa. The aforementioned off-board computing units are also represented in schematic FIG. 2 and designated by 8 therein, wherein in the case of the exemplary embodiment shown in FIG. 2, the computing units 8 are components of the processing network 7 or form the processing network 7. The computing units 8 can thus be the aforementioned off-board computing units of the cluster. In particular it is conceivable that the corresponding computing unit 8 is a corresponding processor unit of a corresponding further vehicle provided externally in relation to and in addition to the vehicle 1, which is autonomously movable or drivable such that the further processor units of the further autonomously movable or drivable vehicles form the processing network 7 to which the computing power of the processor unit 5 of the vehicle 1 is made available. The aforementioned virtual high-performance processor is likewise represented schematically in FIG. 2 and designated by 9, the high-performance processor 9 in the exemplary embodiment shown in FIG. 2 being formed by the computing units 8 and the processor unit 5. Also, the central server in FIG. 2 is designated by 10, wherein the central server 10 is an electronic processor unit or computing device that is off-board in relation to the further vehicles and in relation to the vehicle 1 and provided in addition thereto.

The corresponding computing unit 8 and/or the server 10 can communicate with the processor unit 5 via the data interface 6 and thus wirelessly, for example. As an alternative or in addition, it is conceivable that the respective computing units 8 and/or the server 10 are corded or wired and therefore communicate via the data and energy coupling 3, for example, and can thus exchange data, for example.

The vehicle 1 can be used advantageously, in particular in the following three areas: For one thing, an autonomous driving mode can be ensured by means of the vehicle 1, since the vehicle 1 can be moved or driven autonomously by means of the processor unit 5. Furthermore, the vehicle 1 can be used for achieving grid computing. In the scope of grid computing, at least a portion of the computing power of the processor unit 5 is supplied to the processing network 7 or to the cluster, for example in order to supplement and thus strengthen the processing network 7 with the processor unit 5, in particular with the computing power thereof. Furthermore, bidirectional charging is achievable by means of the vehicle 1. The computing power of the processor unit 5 is made available to the processing network 7 during the process of charging the electrical energy storage unit 2.

Bidirectional charging is understood to mean that the energy storage unit 2 or the vehicle 1 can receive electrical energy from a power grid off-board the vehicle 1, wherein the power grid supplies the electrical energy via the charging infrastructure 4 or comprises the charging infrastructure 4. The electrical energy provided by the power grid, which is received by the vehicle 1, in particular by the energy storage unit 2, is stored in the energy storage unit 2. A volume of electrical energy stored in the energy storage unit 2 is thus augmented. Furthermore, the vehicle 1, in particular the energy storage unit 2, can provide electrical energy stored in the energy storage unit 2 and feed it into the grid, in particular via the charging infrastructure 4. This means that the vehicle 1 can provide the power grid with at least a portion of the electrical energy stored in the energy storage unit 2. The energy storage unit 2 receives the electrical energy supplied by the power grid via, for example, the data and energy coupling 3. Moreover, the electrical energy stored in the energy storage unit 2 can be fed into the power grid via the data and energy coupling 3. This in-feeding of electrical energy, in the context of which the energy storage unit 2 is used as a power storage for the power grid, is also known as 'vehicle-to-grid'.

In general, it can be discerned that the vehicle 1 can be used as an, in particular, autonomously driving transport unit for transporting freight and/or people. The processor unit 5 can be used for autonomous driving and for the aforementioned grid computing. For example, the processor unit 5 can be connected via the data interface 6 to a data network off-board the vehicle 1 and thus, for example, to the processing network 7, in particular via the internet and/or via a virtual private network (VPN).

The energy storage unit 2 is configured as, for example, a high-voltage component and thus as a high-voltage battery (HV battery) so that, for example, particularly high electric outputs are achievable for electrically driving the vehicle 1. The vehicle 1 furthermore comprises, say, a charging device (not illustrated in the figures), via which the energy storage unit 2 can receive the energy supplied by the power grid and store it in itself. Moreover, the energy storage unit 2 can make the electrical energy stored in itself available via the charging mechanism and thereby feed it into the power grid.

Also, provision is preferably made of at least one, in particular external, cooling connection. In other words, the vehicle 1 preferably has at least one cooling connection, via which the vehicle 1 can be connected, at least physically, to a cooling device 11 off-board the vehicle 1 and shown highly schematically in FIG. 2. The cooling device 11 can supply a coolant in the form of, say, a gas, in particular air, or a liquid, wherein the vehicle 1 can receive the coolant supplied by the cooling device 11 via the cooling connection 12 of the vehicle 1 shown highly schematically in FIG. 2. At least one or multiple components of the vehicle 1 can be cooled by means of the received coolant. In particular the energy storage unit 2 and/or the processor unit 5 can be cooled by means of the coolant.

An advantageous balancing, i.e., a particularly advantageous equilibrium, is achievable by the bidirectional charging. Depending on the status of the energy storage unit 2 and/or depending on the status of the power grid, the energy storage unit 2 can either draw electrical energy from the power grid or feed it into the power grid such that, for example, the multiple autonomously movable vehicles, in particular the energy storage units thereof, can function as buffers for the power grid.

In the following, we shall describe aspects of an automation, in particular in terms of an activation, in particular an automatic activation, of the grid computing described in the preceding: the process of making the computing power of the processor unit 5 available to the processing network 7 is also referred to as provision of the computing power of the processor unit 5. For example, the provision of the computing power of the processor unit 5 is activated successively with increasing or ever larger charge status of the energy storage unit 2. In other words, provision is preferably made such that the computing power of the processor unit 5 of the vehicle made available to the processing network 7 is augmented, i.e., increases, in proportion to the increasing volume of electrical energy stored in the energy storage unit 2 of the vehicle.

As an alternative or in addition, provision is made for a stepped release. As the volume of electrical energy stored in at least one of the energy storage units of the autonomously movable vehicles increases, more and more of the processor units of the vehicles are released for grid computing. It is furthermore conceivable for a start of the charging process to be a trigger for making the computing power of the processor unit 5 available to the processing network 7. Provision is optionally made for a transition period such that there is a time interval between a beginning of the charging process and a beginning of the provision of the computing power of the processor unit 5, during which, for example, the charging process is carried out, but a provision of the computing power of the processor unit 5 is not. For example, the computing power is provided successively on the basis of at least one functional specification. In other words, the computing power of the processor unit 5 is not made available to the processing network 7 during the transition time.

As an alternative or in addition to an automatic activation of the provision of the computing power of the processor unit 5, provision can be made for an automatic deactivation of the provision of the computing power of the processor unit 5. For example, the provision of the computing power of the processor unit 5 is automatically terminated based on continuous calculations and/or pending (e.g., future) driving tasks, in particular in terms of an autonomous drive. As an alternative or in addition, it is conceivable for the provision of the computing power of the processor unit 5 to be terminated based on the charge status of the energy storage unit 2. If, for example, the volume of electrical energy stored in the energy storage unit 2 exceeds a predeterminable threshold value, the provision of the computing power of the processor unit 5 is then activated, in particular automatically. If, for example, the volume of electrical energy stored in the energy storage unit 2 falls below the threshold value, the provision of the computing power of the processor unit 5 is then terminated, in particular automatically. The threshold value is equal to, say, 10% of the maximum volume of energy that can be stored in the energy storage unit 2. An undesired, low charge status of the energy storage unit 2 is thus avoidable. It is furthermore conceivable for the computing power of the processor unit 5 provided to the processing network 7 to be reduced, i.e., to decrease, as the volume of electrical energy stored in the energy storage unit 2 decreases.

Also conceivable is the following function: assuming that resources of the processor unit 5 and thus of the vehicle 1, aka processor resources, are greater than what is continuously needed for autonomous driving, the vehicle 1 can continuously vary an operating mode of the vehicle 1, in particular of the processor unit 5, automatically, or the vehicle 1 can even actively assume a parked position and only participate in the power grid if the price for doing so is sufficiently profitable, and do the above based on a driving situation and/or based on the charge status and/or based on the data communication (aka communication connection), and/or based on a price for electrical energy fed into the power grid and/or on the basis of a price for electrical energy drawn from the power grid. During an autonomous trip of the vehicle 1, for example, a compensation or balancing is effected between the autonomous driving and the provision of the computing power of the processor unit 5. During the charging process, the grid computing is activated and the energy storage unit 2 (aka power storage) receives electrical energy from the electric power grid or feeds electrical energy into the power grid on the basis of current electricity prices. Any driving tasks that the vehicle 1 is to perform are then postponed.

As an alternative or in addition, the following four activities can be provided: transport service, grid computing, charging, service as power storage. Transport service is understood to mean that the vehicle 1 can be used to transport at least one person, several people and/or to transport freight. Grid computing is understood to mean that the vehicle 1 can supply the computing power of the processor unit 5 to the processing network 7 or to the cluster. Charging is understood to mean that the energy storage unit 2 can receive electrical energy from the power grid and store it in itself. Service as power storage is understood to mean that the energy storage unit 2 can feed electrical energy into the power grid. The four activities are planned based on, say, predictive data and thus on the basis of empirical values and/or on the basis of centralized planning and/or on the basis of decentralized or centralized artificial intelligence. For planning or for carrying out the four activities, use is made of, for example, navigation data and/or a charging pole use prediction and/or traffic and client prognosis data in order to optimize the activities.

The vehicle is idle during the charging process. The aforementioned coolant can then be used for a supplemental cooling, in particular of the processor unit 5. The cooling connection 12 is, for example, designed in such a way that it is integrated in a power connection of the vehicle 1, or the power connection and the cooling connection 12 are combined in such a way that the electrical connection of the vehicle 1 to the power grid or to the charging infrastructure 4 is established simultaneously with the connection of the cooling connection 12 to the off-board cooling device. The vehicle 1 thus obtains access to external media such as air and/or liquid for the cooling of at least one component or multiple components of the vehicle 1. By means of the corresponding medium, the processor unit 5 and/or at least one other component such as the energy storage unit 2, for example, can be cooled, in particular while the energy storage unit 2 is receiving electrical energy from the power grid or is feeding it into the power grid. Excessive temperatures of the vehicle 1 are thus avoidable.

Provision is preferably made such that the computing power of the processor unit 5 is made available to the processing network 7 for a fee so that the vehicle 1 or the user or owner thereof is reimbursed for the provision of the computing power of the processor unit 5 to the processing network 7. A reimbursement value, which characterizes the computing power that will be or was made available to the processing network 7 by the processor unit 5, is determined for this purpose. For example, a valuation is made of all of the computing operations provided and performed, wherein said operations can be, for example, integer and/or floating-point operations. Also, an assessment of calculated and transferred cryptocurrency units and/or of calculated integration sums and/or of a specific calculation factor is made in the participating processing network 7.

For example, if the energy storage unit 2 is receiving electrical energy from the power grid, the energy storage unit 2 is thus drawing a volume of energy, or volume of current, from the power grid. For example, a distinction is made between charging current and computing current. For example, charging current is understood to mean a first portion of the energy received by the energy storage unit 2 from the power grid, whereas the computing current is a second portion of the energy received by the energy storage unit 2 from the power grid. The energy storage unit 2 is recharged with the charging current by virtue of the charging current being stored in the energy storage unit 2. The computing current is used to run processor unit 5 so that it can supply its computing power, i.e., make it available, to the processing network 7. For example, the current volume and a corresponding time of a transfer price are assessed. Furthermore, a profit option is calculated by comparing the charging, the provision of the computing power and the service as a power storage, in particular in a current clearing period. For example, an online assessment and an online calculation take place. In this process, the accessibility and the expense for reaching the charging infrastructure 4 compared to another utilization are rated and considered.

Other cryptocurrencies such as Ethereum or the like can be used as an alternative or in addition to Bitcoins. For example, an application software calculation is performed in a computer network, which is also known as a computational grid. In other words, cryptocurrencies such as Bitcoin, Ether, EOS and/or other currencies are calculated and mined. At least one or multiple blockchains or calculations thereof can be used for fee calculation or for calculation of the reimbursement. Examples of other possible uses include the negotiation of driving job transactions without a middleman, an access to the vehicle 1 and/or a basis for automobile supply and logistics chains.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for using a processor unit of an autonomously movable vehicle, the method comprising:

providing a computing power of the processor unit to at least one off-board processing network and/or to a cluster of off-board computing units during a process of charging an electrical energy storage unit of the vehicle, wherein the computing power of the processor unit is made available to the processing network and/or to the cluster based on a charge status of the electrical energy storage unit of the vehicle, and wherein the computing power of the processor unit of the vehicle made available to the processing network and/or to the cluster is increased in proportion to an increasing volume of electrical energy stored in the energy storage unit of the vehicle.

2. The method of claim 1, wherein a virtual high-performance processor, which is centrally managed by a server, is formed by the processing unit of the vehicle and at least one additional processing unit of at least one additional autonomously movable vehicle.

3. The method of claim 1, further comprising:
providing a payment for the provided computing power of the processor unit.

4. The method of claim 2, wherein the processor unit of the vehicle communicates with the server via a data interface of the vehicle.

5. The method of claim 3, wherein the fee is determined based on a number of computing operations performed by the processor unit and provided to the processing network and/or to the cluster.

6. The method of claim 3, wherein the payment is provided via at least one blockchain process.

7. The method of claim 1, further comprising:
providing a computing power of the processor unit to at least one off-board processing network and/or to a cluster of off-board computing units during a process of charging an electrical energy storage unit of the vehicle, wherein the computing power of the processor unit is made available based on predictive data, wherein the predictive data comprise an anticipated, future charge status of the energy storage unit;

a planned route of the vehicle;

an anticipated, future temperature;

an anticipated, future environmental condition of an anticipated, future environment of the vehicle;

a point in time of an anticipated, future start of a trip of the vehicle; and/or an anticipated, future status of the processing network and/or of the cluster and/or of a power grid off-board the vehicle.

8. The method of claim 1, further comprising:
receiving, by the electrical energy storage unit of the vehicle, electrical energy from a power grid off-board the vehicle; and storing, by the electrical energy storage unit of the vehicle, the received electrical energy during at least a portion of a process of charging the electrical energy storage unit of the vehicle.

9. The method of claim 1, further comprising:
providing, by the electrical energy storage unit of the vehicle, electrical energy to a power grid off-board the vehicle during at least a portion of a process of charging the electrical energy storage unit of the vehicle.

10. The method of claim 8, wherein the electrical energy storage unit receives the electrical energy from the power grid based on a price for the energy received from the power grid during the portion of the charging process.

11. The method of claim 9, wherein the electrical energy storage unit provides the electrical energy to the power grid based on a price for the energy provided to the power grid during the portion of the charging process.

12. The method of claim 1, further comprising:
charging the electrical energy storage unit of the vehicle while providing the computing power of the processor unit; and receiving, by the vehicle while charging the electrical energy storage unit, at least one coolant via at least one coolant line from a cooling device off-board the vehicle, wherein the received at least one coolant cools the electrical energy storage unit and/or the processor unit.

13. The method of claim 1, wherein the processor unit is coupled to the processing network and/or to the cluster via at least one wireless data connection and/or via at least one physical data cable.

* * * * *